United States Patent [19]

Sommazzi et al.

[11] Patent Number: 5,310,871
[45] Date of Patent: May 10, 1994

[54] PROCESS FOR PREPARING POLYMERS BASED ON CARBON MONOXIDE AND OLEFINS

[75] Inventors: Anna Sommazzi, S. Margherita Ligure; Fabio Garbassi, Novara; Giovanni Mestroni, Trieste; Barbara Milani, Gradisca d'Isonzo, all of Italy

[73] Assignee: Enichem S.P.A., Milan, Italy

[21] Appl. No.: 14,527

[22] Filed: Feb. 8, 1993

[51] Int. Cl.$^5$ .............................................. C08G 67/02
[52] U.S. Cl. .................................... 528/392; 502/162
[58] Field of Search .......................................... 528/392

[56] References Cited

U.S. PATENT DOCUMENTS

| | | | |
|---|---|---|---|
| 4,786,714 | 11/1988 | Drent | 528/392 |
| 4,788,279 | 11/1988 | Drent | 528/392 |
| 4,831,113 | 5/1989 | Van Broekhoven et al. | 528/392 |
| 5,034,507 | 7/1991 | Smith | 528/392 |
| 5,216,120 | 6/1993 | Drent et al. | 528/392 |

FOREIGN PATENT DOCUMENTS

| | | |
|---|---|---|
| 0222454 | 5/1987 | European Pat. Off. |
| 0300583 | 1/1989 | European Pat. Off. |
| 0408155 | 1/1991 | European Pat. Off. |
| 0501576 | 9/1992 | European Pat. Off. |

*Primary Examiner*—Harold D. Anderson
*Attorney, Agent, or Firm*—Oblon, Spivak, McClelland, Maier & Neustadt

[57] ABSTRACT

Process for preparing straight, alternate polymers based on carbon monoxide and at least one olefin, which comprises causing carbon monoxide and the olefin to react in the presence of:
(a) a catalyst of general formula (I):

$$[Pd(chel)(chel')]^{++}[A^-]_2 \qquad (I)$$

wherein chel and chel', which may be the same, or different from each other, represent a bidentate chelating agent and A− stands for an anion of an acid having a pKa smaller than 6; and
(b) optionally, an organic oxidizer agent.

19 Claims, No Drawings

PROCESS FOR PREPARING POLYMERS BASED ON CARBON MONOXIDE AND OLEFINS

The present invention relates to a process for preparing polymers based on carbon monoxide and olefins.

More particularly, the present invention relates to a process for preparing copolymers and terpolymers of carbon monoxide, ethylene and, optionally, at least one hydrocarbon containing an unsaturation of alkenyl type.

By means of the expression "hydrocarbon containing an unsaturation of alkenyl type", as used in the instant disclosure and in the attended claims, such olefins, as propylene, butene, styrene, norbornene, and so forth, are meant.

Polymers based on carbon monoxide and olefins, or polyketones, are known in technical literature and are described for example, in Kirk-Othmer, Encyclopedia of Chemical Technology, Second Edition, Vol. 12, page 132, 1967.

More particularly, polymers based on carbon monoxide and ethylene, having a high molecular weight, and in which the $-CO-(C_2H_4)-$ unit is repeated in alternate sequence, can be prepared in the presence of a catalytic system constituted by a palladium compound, a phosphorus or nitrogen containing bidentate chelating agent, an anion of a non-hydraulic acid with a pKa lower than 4 and an organic oxidizer agent.

In U.S. Pat. No. 4,786,714, a process is disclosed for preparing polymers of carbon monoxide and olefins, in particular ethylene, carried out in the presence of a catalytic composition constituted by:
(1) a compound of a metal of the VIII Group selected from palladium, cobalt and nickel;
(2) an anion of a non-hydraulic acid having a pKa lower than 6;
(3) a nitrogen containing bidentate chelating agent having the general formula:

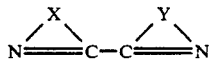

wherein X and Y represent bridging groups containing either 3 or 4 atoms in the bridge moiety, at least two of which are carbon atoms.

The catalytic system known from the prior art are characterized by the presence of the acidic cocatalyst which, besides creating problems of technological character, such as, e.g., corrosion of the autoclaves, tends to get embedded inside the polymer, worsening the properties thereof.

The present Applicant has found now a catalytic system for preparing polymers based on carbon monoxide and olefins which was never described before in technical literature in connection with this function, and makes it possible the drawbacks to be overcome, which are associated with the presence of the acidic cocatalysts known from the prior art.

Therefore, the subject-matter of the present invention is a process for preparing straight, alternate polymers based on carbon monoxide and at least one olefin, which process comprises causing carbon monoxide and the olefin to react in the presence of:
(a) a bis-chelated catalyst of general formula (I)

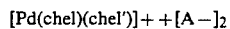

wherein chel and chel', which may be the same, or different from each other, represent a bidentate chelating agent and $A-$ stands for an anion of an acid having a pKa smaller than 6; and
(b) optionally, an organic oxidizer agent.

When (chel) and (chel') are the same, the bidentate chelating agent is a nitrogen containing one; when they are different, (chel) represents a nitrogen containing chelating agent, or a phosphorus containing chelating agent, and (chel') represents a nitrogen containing chelating agent different from the first one.

In the catalyst of general formula (I), the nitrogen-containing bidentate chelating agent are selected from those of general formula (II):

in which X and Y, which may be the same or different from each other, represent organic bridging groups, each containing at least three atoms in the bridge moiety, at least two of which are carbon atoms. When additionally to carbon atoms, the moieties X and Y contain other atoms, these preferably are nitrogen atoms.

Preferred nitrogen-containing bidentate chelating agents according to the present invention are those in which the bridging groups X and Y are the same and contain from 3 to 10 atoms, at least two of which are carbon atoms.

The phosphorus-containing bidentate chelating agents are selected from those of general formula (III):

wherein R represents an alkyl radical containing from 1 to 4 carbon atoms, and $R_1-R_4$ stand for a $C_1-C_{10}$ alkyl radical, a $C_3-C_{10}$ cycloalkyl radical or a $C_6-C_{12}$ aromatic radical, possibly substituted with $C_1-C_4$ alkyl or alkoxy radicals.

Examples of nitrogen-containing bidentate chelating agents are: 2,2'-bipyridyl (bipy), 4,4'-dimethyl-2,2'-bipyridyl, 5,5'-dimethyl-2,2'-bipyridyl, 5-methyl-2,2'-bipyridyl 4,4'-diphenyl-2,2'-bipyridyl, 1,10-phenanthroline (phen), 3-methyl-1,10-phenanthroline, 4,7-dimethyl-1,10-phenanthroline, 3,8-dimethyl-1,10-phenanthroline, 4,7-diphenyl-1,10-phenanthroline, (PH-phen), 4,7-dichloro-1,10-phenanthroline, 3,4,7,8-tetramethyl-1,10-phenanthroline (TM-phen), 4,4'-dimethyl-5,5'-bioxazole, and so forth.

Nitrogen containing bidentate chelating agents useable in the catalyst of general formula (I) are also 2,2'-bipyridyl and 1,10-phenanthroline substituted with $C_1-C_{20}$ alkyl or alkylaryl radicals possibly containing one or more chiral centres.

Examples of phosphorus containing bidentate chelating agents are: 1,3-bis(diphenylphosphino)propane (DPPP), 1,3-bis-4-methoxyphenylphosphino)propane, and so forth.

$A-$ is an essentially non-coordinating and no-esterifiable anion selected from: hexafluorophosphate, tetrafluoroborate, fluoride ion, hexafluoroantimoniate, trifluoroacetate, mesitoate (Mes), dimethylbenzoate, trifluorobenzoate, tetrafluorobenzoate, pentafluorobenzoate, and so forth.

When the chelating groups are equal to each other, the catalysts of general formula (I) are known compounds, and can be prepared according to as described in Journal of Molecular Catalysts, 42, 1987, page 67.

Examples of bis-chelated catalysts of general formula (I) in which the chelating groups are equal to each other are:

* $[Pd(bipy)_2]^{++}[PF_6^-]_2$;

* $[Pd(phen)_2]^{++}[PF_6^-]_2$;

* $[Pd(bipy)_2]^{++}[CF_3COO^-]_2$;

* $[Pd(phen)_2]^{++}[CF_3COO^-]_2$.

When the chelating groups are different from each other, the catalysts of general formula (I) are novel products and can be obtained according to usual synthetic procedures as shown in the following examples.

Examples of bis-chelated catalysts of general formula (I) in which the chelating groups are different from each other, are:

* $[Pd(DPPP)(bipy)]^{++}[PF_6^-]_2$

* $[Pd(phen)(bipy)]^{++}[PF_6^-]_2$

* $[Pd(TM-phen)(bipy)]^{++}[PF_6^-]_2$.

The organic oxidizer, i.e., the second, optional component of the catalytic system used in the process according to the present invention, is selected from quinones, aliphatic nitriles, nitroaromatic derivatives, organic peroxides and the like. However, the preferred oxidizer agent is p-benzoquinone.

The polymerization reaction is carried out by causing at least one olefin, for example one or two olefins, to react with carbon monoxide in the presence of a solvent, at a temperature comprised within the range of from 20° to 200° C. and at a pressure comprised within the range of from 40 to 100 bars. The molar ratios of olefin:carbon monoxide are comprised within the range of from 10:1 to 1:5, preferably of from 5:1 to 1:2.

Among the solvents, particularly preferred are alcohols, such as methanol or ethanol, which may be either anhydrous or aqueous. In the latter case, as the oxidizer agent (b), either tetramethoxy- or tetraethoxy cyclohexadiene may be used, which, in the presence of water, form p-benzoquinone and alcohol.

The catalyst (a) is pre-dispersed in the solvent in such amounts as to yield a concentration of palladium gramatoms per each mol of olefin comprised within the range of from $10^{-6}$ to $10^{-1}$, and the cocatalyst (b) is added in amounts comprised within the range of from 0 to 10,000, preferably of from 10 to 5,000 mols per gramatom of palladium.

According to a preferred embodiment of the process according to the present invention, the olefin is selected from ethylene, propylene, styrene, norbornene, or their mixtures. Preferred olefin is ethylene.

By means of the present process, polymers and copolymers of carbon monoxide and at least one olefin can be obtained which have a straight and alternate structure, confirmed by NMR (Nuclear Magnetic Resonance) analysis an inherent viscosity, or LVN (Limiting Viscosity Number), as measured in m-cresol at 100° C., higher than 0.1 dl/g, generally comprised within the range of from 0.5 to 5 dl/g.

The polymers obtained by means of the process according to the present invention can be used in order to prepare formed bodies manufactured according to the normal techniques of fabrication of thermoplastic material, such as injection molding, extrusion, thermoforming, and so forth.

In order to better understand the present invention and to practice it, in the following some illustrative, non-limitative examples are reported.

EXAMPLE 1

Synthesis of $[Pd(phen)_2]^{++}[CF_3COO^-]_2$ 1 g of $Pd(CF_3COO)_2$ is dissolved in 100 ml of acetone. After 30 minutes, a red solution is obtained. To the filtered solution, 1.5 g of 1,10-phenanthroline (phen) is added (ratio of Pd:phen=1:2.5 by mol).

The colour of the solution turns into yellow and, after a few minutes, the precipitation of a yellow solid begins. After 30 minutes of stirring at room temperature, the solid precipitate is filtered off under the pump vacuum, is washed with cold acetone and is dried under vacuum (yield: 70%).

Elemental analysis for $PdC_{28}H_{16}N_4O_4F_6$: calculated values: C=48.5; H=2.33; N=8.09; found values: C=48.3; H=2.41; N=7.88.

Polymerization of CO/ethylene 500 ml of methanol is charged to an autoclave of 2 liters of capacity. 0.5 mmol of $[Pd(phen)_2]^{++}[CF_3COO^-]_2$, 40 mmol of p-benzoquinone, and a mixture of CO/ethylene (1:1) are added, up to a pressure of 58 atm.

After a 5 hours of reaction at 90° C., the autoclave is cooled down to room temperature, and the pressure is vented.

The copolymer is filtered, is washed with methanol and is dried at room temperature.

47 g of alternate copolymer, as it results from NMR analysis, is obtained, with a melting point of approximately 260° C. and an LVN of 0.10 dl/g.

EXAMPLE 2

Synthesis of $[Pd(phen)_2]^{++}[PF_6^-]_2$ 0.4 g of $Pd(NO_3)_2 \times 2H_2O$ is dissolved in 40 ml of acetone, and after 30 minutes an orange coloured suspension is obtained, which is filtered.

To the resulting solution, 0.78 g of 1,10-phenanthroline is added (Pd:phen=1:2.5). A yellow precipitate of $[Pd(phen)_2]^{++}[NO_3^-]_2$ is immediately formed and is filtered off under the pump vacuum, is washed with acetone and is dried under vacuum.

0.5 g of $[Pd(phen)_2]^{++}[NO_3^-]_2$ is suspended in 30 of methanol. 20 minutes later, 0.55 g of $NH_4PF_6$ dissolved in the minimal volume of methanol is added.

The system is kept with stirring 30 minutes at room temperature, then the yellow solid is filtered off under the pump vacuum, is washed with methanol and is dried under vacuum (yield: 87%).

Elemental analysis for $PdC_{24}H_{16}N_2P_2F_{12}$: calculated values: C=38.1; H=2.13; N=7.40; found values: C=38.2; H=2.14; N=7.15.

Polymerization of CO/ethylene

The polymerization is carried out under the same conditions as of Example 1, except for 0.5 mmol of $[Pd(phen)_2]^{++}[PF_6^-]_2$ being used. 107 g of alternate copolymer with an LVN of 1.13 dl/g is obtained.

EXAMPLE 3

Synthesis of $[PD(TM\text{-phen})_2]^{++}[PF_6^-]_2$ 0.2 g of $Pd(NO_3)_2 \times 2H_2O$ is dissolved in 20 ml of acetone, and after 30 minutes an orange coloured suspension is obtained, which is filtered.

To the resulting solution, 0.51 g of 3,4,7,8-tetramethyl-1,10-phenanthroline is added (TM-phen) (Pd:TM-phen=1:2.5).

A yellow precipitate of $[Pd(TM\text{-phen})_2]^{++}[NO_3^-]_2$ is immediately formed and is filtered off under the pump vacuum, is washed with acetone and is dried under vacuum.

0.5 g of $[Pd(TM\text{-phen})_2]^{++}[NO_3^-]_2$ is suspended in 30 ml of methanol. 20 minutes later, 0.46 g of $NH_4PF_6$ dissolved in the minimal volume of methanol is added.

The system is kept with stirring 30 minutes at room temperature, then the yellow solid is filtered off under the pump vacuum, is washed with methanol and is dried under vacuum (yield: 70%).

Elemental analysis for $PdC_{32}H_{32}N_4P_2F_{12}$: calculated values: C=44.2; H=3.71; N=6.45; found values: C=44.0; H=3.82; N=6.50.

Polymerization of CO/ethylene

The polymerization is carried out under the same conditions as of Example 1, except for 0.5 mmol of $[Pd(TM\text{-phen})_2]^{++}[PF_6^-]_2$ being used. 12 g of alternate copolymer with an LVN of 0.50 dl/g is obtained.

EXAMPLE 4

Synthesis of $[Pd(PH\text{-phen})_2]^{++}[PF_6^-]_2$ 0.2 g of $Pd(NO_3)_2 \times 2H_2O$ is dissolved in 20 ml of acetone, and after 30 minutes an orange coloured suspension is obtained, which is filtered.

To the resulting solution, 0.72 g of 4,7-diphenyl-1,10-phenanthroline is added (PH-phen) (Pd:PH-phen=1:2.5). A yellow precipitate of $[Pd(PH\text{-phen})_2]^{++}[NO_3^-]_2$ is immediately formed and is filtered off under the pump vacuum, is washed with acetone and is dried under vacuum.

0.5 g of $[Pd(PH\text{-phen})_2]^{++}[NO_3^-]_2$ is suspended in 30 ml of methanol. 20 minutes later, 0.36 g of $NH_4PF_6$ dissolved in the minimal volume of methanol is added ($Pd:PF_6=1:4$).

The system is kept 30 minutes with stirring at room temperature, then the yellow solid is filtered off under the pump vacuum, is washed with methanol and is dried under vacuum. (yield: 60%).

Elemental analysis for $PdC_{48}H_{32}N_4P_2F_{12}$: calculated values: C=54.3; H=3.02; N=5.28; found values: C=55.0; H=3.38; N=5.31.

Polymerization of CO/ethylene

The polymerization is carried out under the same conditions as of Example 1, except for 0.5 mmol of $[Pd(PH\text{-phen})_2]^{++}[PF_6^-]_2$ being used. 28 g of alternate copolymer with an LVN of 0.20 dl/g is obtained.

EXAMPLE 5

Synthesis of $[Pd(bipy)_2]^{++}[PF_6^-]_2$ 0.25 g of $PdCl_2$ is dissolved at room temperature in a solution containing 0.13 g of LiCl in 12 ml of water.

After 2 hours, a deep orange coloured solution of $LiPdCl_4$ is obtained. To this solution, 130 ml of water and a solution of 2,2'-bipyridyl (bipy) in methanol (0.66 g of bipy dissolved in 5 ml of methanol) are added (Pd:bipy=1:3). A yellow precipitate is immediately formed.

The system is slightly warmed and, after 30 minutes, all the solid material is dissolved, yielding a bright yellow solution which is filtered when warm. To the resulting filtrate, a solution of $NH_4PF_6$ in water (0.69 g of $NH_4PF_6$ in the minimal amount of water) is added dropwise. A yellow solid immediately forms, which is kept with stirring at room temperature for 30 minutes. The solid is then filtered off under the pump vacuum, is washed with water and cold methanol and is dried under vacuum (yield: 82%).

Elemental analysis for $PdC_{20}H_{16}N_4P_2F_{12}$: calculated values: C=33.9; H=2.28; N=7.91; found values: C=33.6; H=2.24; N=8.24.

Polymerization of CO/ethylene

The polymerization is carried out under the same conditions as of Example 1, except for 0.5 mmol of $[Pd(bipy)_2]^{++}[PF_6^-]_2$ being used at the temperature of 70° C. 164 g of alternate copolymer with an LVN of 1.90 dl/g is obtained.

EXAMPLE 6

Synthesis of $[Pd(DPPP)(bipy)]^{++}[PF_6^-]_2$ 0.6 g of $[Pd(DPPP)(CH_3COO)_2]$ is dissolved in 20 ml of methanol, with a yellow coloured solution being obtained to which 0.19 g of 2,2'-bipyridyl (Pd:bipy=1:1.3) is added. The colour of the solution turns into orange. Then a solution of $NH_4PF_6$ in methanol (0.34 g of $NH_4PF_6$ dissolved in 5 ml of methanol) is added dropwise ($Pd:PF_6=1:2.2$).

The solution turns again into yellow and, after a few minutes of stirring at room temperature, the precipitation occurs of the product as a white solid which, after one hour, is filtered under the pump vacuum, is washed with cold methanol and is dried under vacuum (yield: 42%).

The synthesis of $[Pd(DPPP)(bipy)]^{++}[PF_6^-]_2$ can also be carried out according to the following alternative route: 460 mg of $[Pd(DPPP)(CF_3COO)_2]$ is suspended in 15 ml of methanol. To the resulting white suspension, 0.12 g of bipy is added (Pd:bipy=1:1.2). As bipy is progressively added, the suspension progressively turns into more and more yellow, until all the solid matter is dissolved, with an orange coloured solution being obtained to which a solution of $NH_4PF_6$ in methanol (0.22 g of $NH_4PF_6$ dissolved in 3.2 ml of methanol) is added dropwise ($Pd:PF_6=1:2.2$). After the addition of the first few drops, the formation is observed of a white solid which is kept with stirring at room temperature for one hour. The product is then filtered under the pump vacuum, is washed with ethyl ether and is dried under vacuum (yield 84%).

Elemental analysis for $PdC_{37}H_{34}N_2P_4F_{12}$: calculated values: C=46.1; H=3.55; N=2.90; found values: C=45.6; H=3.39; N=2.95.

Polymerization of CO/ethylene

The polymerization is carried out under the same conditions as of Example 1, except for 0.5 mmol of [Pd(DPPP)(bipy)]++[PF$_6$−]$_2$ being used at the temperature of 80° C. and under a pressure of 56 atm. 117 g of alternate copolymer with an LVN of 1.10 dl/g is obtained.

EXAMPLE 7

Synthesis of [Pd(phen)(bipy))]++[PF$_6$−]$_2$ 300 mg of [Pd(phen)(CF$_3$COO)$_2$] is suspended in 13 ml of methanol. To the resulting yellow suspension, 110 mg of 2,2'-bipyridyl is added (Pd:bipy=1:1.2). The colour of the suspension turns into orange and, a few minutes later, all the solid matter is dissolved, yielding a orange coloured solution. Then, a solution of NH$_4$PF$_6$ in methanol (0.19 g of NH$_4$PF$_6$ dissolved in 3 ml of methanol) is added dropwise (Pd:PF$_6$=1:2).

Immediately after the addition of the first few drops, a yellow solid precipitates which, when addition is complete, is kept with stirring at room temperature for a further 30 minutes. The resulting precipitate is then filtered off under the pump vacuum, is washed with methanol and is dried under vacuum (yield: 82%).

Elemental analysis for PdC$_{22}$H$_{16}$N$_6$P$_2$F$_{12}$: calculated values: C=36.1; H=2.2; N=7.65; found values: C=36.4; H=2.16; N=7.46.

Polymerization of CO/ethylene

The polymerization is carried out under the same conditions as of Example 1, except for 0.5 mmol of [Pd(phen)(bipy)]++[PF$_6$−]$_2$ being used at the temperature of 70° C. 94 g of alternate copolymer with an LVN of 1.50 dl/g is obtained.

EXAMPLE 8

Synthesis of [Pd(phen)(bipy)]++[PF$_6$−]$_2$ 300 mg of [Pd(TM-phen)(CF$_3$COO)$_2$] is suspended in 15 ml of methanol. To the resulting yellow suspension, 99 mg of 2,2'-bipyridyl is added (Pd:bipy=1:1.2). The colour of the suspension turns into yellow and, a few minutes later, most of the solid matter is dissolved, yielding a orange coloured solution. Then, a solution of NH$_4$PF$_6$ in methanol (0.17 g of NH$_4$PF$_6$ dissolved in 3 ml of methanol) is added dropwise (Pd:NH$_4$PF$_6$=1:2).

Immediately after the addition of the first few drops, a yellow solid precipitates which, when addition is complete, is kept with stirring at room temperature for 30 minutes. The resulting precipitate is then filtered off under the pump vacuum, is washed with methanol and is dried under vacuum (yield: 83%).

Elemental analysis for PdC$_{26}$H$_{24}$N$_4$P$_2$F$_{12}$: calculated values: C=39.6; H=3.07; N=7.10; found values: C=39.4; H=3.02; N=6.90.

Polymerization of CO/ethylene

The polymerization is carried out under the same conditions as of the Example 1, except for 0.5 mmol of [Pd(TM-phen)(bipy)]++[PF$_6$−]$_2$ being used at the temperature of 70° C. 50 g of alternate copolymer with an LVN of 0.50 dl/g is obtained.

EXAMPLE 9

The process is carried out under the same conditions as of Example 2 with the exception that the reaction time is of 2.5 hours. 70 g of alternate copolymer is obtained.

EXAMPLE 10

The process is carried out under the same conditions as of Example 2, with the exception that the operating temperature is of 80° C. 118 g of alternate copolymer is obtained.

EXAMPLE 11

The process is carried out under the same conditions as of Example 2, with the exception that the operating temperature is of 70° C. 60 g of alternate copolymer is obtained.

EXAMPLE 12

The complex [Pd(phen)$_2$]++[PF$_6$−]$_2$ (0.5 mmol) is suspended in 500 ml of anhydrous methanol. 40 mmol of p-benzoquinone, 500 ml of styrene are added and the autoclave is charged with 40 atm of CO.

After a 5 hours of reaction, 126 g is obtained of alternate copolymer having a melting point of 263° C. and an LVN of 0.25 dl/g.

We claim:

1. Process for preparing polymers based on carbon monoxide and at least one olefin, which comprises reacting carbon monoxide and the olefin in the presence of a solvent, and:

(a) a catalyst of general formula (I):

[Pd(chel)(chel')]++[A−]$_2$     (I)

wherein chel and chel', which are the same, or different from each other, represent a nitrogen or phosphorus containing bidentate chelating agent and A− represents an anion of an acid having a pKa smaller than 6;

without or with (b) an organic oxidizer agent.

2. Process according to claim 1, in which when (chel) and (chel') are the same, the bidentate chelating agent is a nitrogen containing agent; when different, (chel) represents a nitrogen containing chelating agent, or a phosphorus containing chelating agent, and (chel') represents a nitrogen containing chelating agent different from the first agent.

3. Process according to claim 1 or 2, in which the nitrogen-containing bidentate chelating agent has the general formula (II):

in which X and Y, which are the same or different from each other, represent organic bridging groups, each containing at least three atoms in the bridge moiety, at least two of which are carbon atoms.

4. Process according to claim 3, in which X and Y additionally contain nitrogen atoms.

5. The process of claim 3, in which the nitrogen containing bidentate chelating agent has equal bridging groups X and Y, said bridging groups each containing 3 to 10 atoms, at least two of which are carbon atoms.

6. Process according to claim 1 or 2, in which the phosphorus-containing bidentate chelating agents are selected from those of general formula (III):

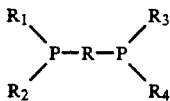 (III)

wherein R represents an alkyl radical containing from 1 to 4 carbon atoms, and $R_1$–$R_4$ radicals are a $C_1$–$C_{10}$ alkyl radical, a $C_3$–$C_{10}$ cycloalkyl radical, a $C_6$–$C_{12}$ aromatic radical, or a $C_6$–$C_{12}$ aromatic radical substituted with $C_1$–$C_4$ alkyl or alkoxy radicals.

7. The process of claim 1, in which A— is an essentially non-coordinating and non-esterifiable anion.

8. The process of claim 1, in which the organic oxidizer is selected from the group consisting of quinones, aliphatic nitriles, nitro aromatic derivatives, and organic peroxides.

9. The process of claim 1, comprising reacting at least one olefin with carbon monoxide in the presence of a solvent, at a temperature of from 20° to 200° C. and at a pressure of from 40 to 100 bars.

10. The process of claim 1, in which the molar ratios of olefin to carbon monoxide are within the range of from 10:1 to 1:5.

11. The process of claim 1, comprising reacting in a solvent selected from the group consisting of anhydrous alcohols and aqueous alcohols.

12. The process of claim 11, wherein the solvent is an aqueous alcohol, and the oxidizer agent (b) is selected from the group consisting of tetramethoxy- and tetraethoxy cyclohexadiene.

13. The process of claim 11, in which the catalyst (a) is pre-dispersed in the solvent in such amounts as to yield a concentration of palladium gram-atoms per each mole of olefin of from $10^{-6}$ to $10^{-1}$, and the oxidizer agent (b) is added in amounts of from 0 to 10,000 moles per gram-atom of palladium.

14. The process of claim 1, in which the olefin is selected from the group consisting of ethylene, propylene, styrene, norbornene, and mixtures thereof.

15. The process of claim 13, wherein the oxidizer agent (b) is added in amounts of from 10 to 5,000 moles per gram-atom of palladium.

16. The process of claim 22, wherein the chel is a nitrogen containing bidentate chelating agent or a phosphorus containing chelating agent and wherein chel' is a nitrogen containing chelating agent other than chel.

17. The process of claim 16 wherein said catalyst is [Pd(1,3-bis(diphenylphosphine propane)(bipyridyl)]++[PF$_6^-$]$_2$.

18. The process of claim 16 wherein said catalyst is [Pd(1,10-phenanthroline)(bipyridyl)]++[PF$_6^-$]$_2$.

19. The process of claim 16 wherein said catalyst is [Pd(3,4,7,8-tetramethyl-1,10-phenanthroline)(bipyridyl)]++[PF$_6^-$]$_2$.

* * * * *